May 15, 1928.
H. S. MABEY
DEPHLEGMATOR
Original Filed March 24, 1920
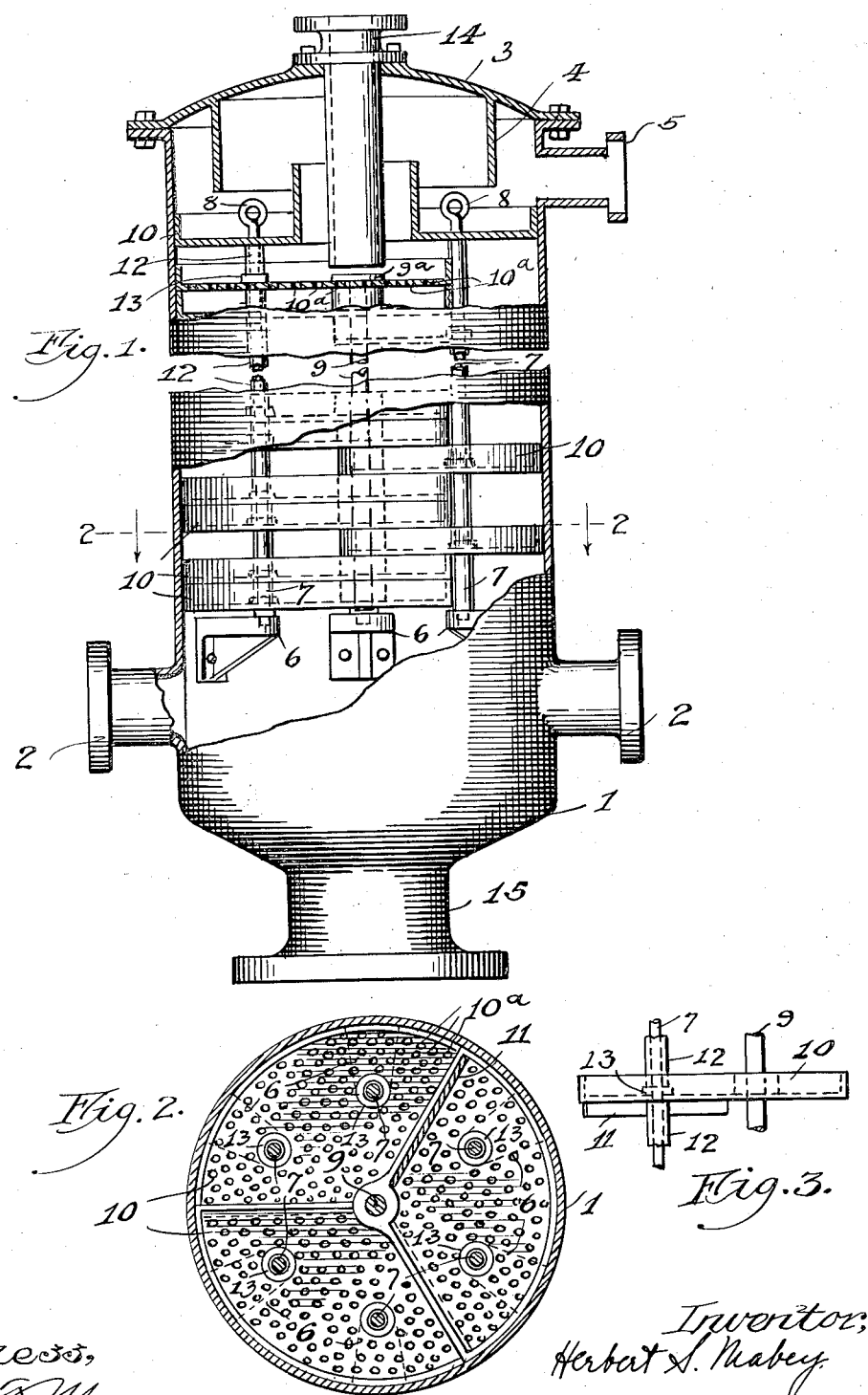

Patented May 15, 1928.

1,670,118

UNITED STATES PATENT OFFICE.

HERBERT S. MABEY, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

DEPHLEGMATOR.

Application filed March 24, 1920, Serial No. 368,223. Renewed August 13, 1926.

My invention relates to improvements in dephlegmators and refers more particularly to dephlegmators to be used in connection with the treating of petroleum oils.

Among the salient objects are to provide a dephlegmator which may be mounted in connection with any type of distillation process but one which is peculiarly adapted to processes in which the vapors are dephlegmated with the assistance of the incoming raw oil charge; to provide a dephlegmator which permits of a preheating of the raw oil and dephlegmation of the vapors thru said oil by causing the incoming raw oil to travel in an opposed direction and in intimate relation with the vapors; to provide a dephlegmator in which due to the arrangement of the dephlegmating members, the gaseous vapors are directed by a very circuitous route therethrough, materially increasing the velocity of the vapors and permitting ample opportunity for effective heat transfer from the vapors to the incoming oil; to provide a dephlegmator in which more of the space therein is effectually utilized for condensation purposes and so constructed that there is less short circuiting of the vapors, one which occupies a smaller amount of space, is more easily cleaned and one which is more economical to build and maintain than the common type of dephlegmator now used in connection with stills.

In the drawings:

Fig. 1 is a side elevation of the dephlegmator partly in section and with portions of the shell broken away to show the internal arrangement, also the central portion broken away.

Fig. 2 is a sectional plan taken on line 2—2 of Fig. 1 looking in the direction of the arrows.

Fig. 3 is a fragmentary detail of the means for supporting the dephlegmating pans.

In the distillation of hydrocarbon oils, after the vaporization has taken place in a heating or cracking zone, the vapors are generally directed through an aerial condenser or dephlegmator in which a portion of said vapors are condensed, the condensate being returned to be retreated and the uncondensed vapors subjected to further condensation in a water condenser or the like. In some cracking systems the raw oil is injected into the dephlegmator or aerial condenser and caused to travel in a course opposed to that of the vapors. In such systems, the raw oil is preheated by the hot oil vapors and at the same time serves as a dephlegmating agent in condensing a portion of the vapors. The dephlegmator or aerial condenser here described is of a type adapted to be interposed in such a system.

Referring to the drawings, the casing 1 is fitted with vapor inlet pipes 2 through which the oil vapors from the cracking zone (not shown) are introduced. This casing is fitted with a removable top plate 3 having baffle plates 4 which direct the uncondensed vapors in the top of the dephlegmator to the outlet pipes 5. In the lower portion of the casing are riveted or otherwise fastened, a number of supports 6 into which are set the tie-rods 7 in suitable holes. The top of these tie-rods are bent to form rings 8 which furnish a means for removing the rods when the interior of the dephlegmator is to be cleaned. A center pin or rod 9 having an enlarged head $9^a$ is passed down thru the center bosses of the pans 10 to assist in holding the pans in place. These pans are of pressed metal and are shaped in the form of a sector of a circle and are arranged one above the other in the dephlegmator, each pan being so situated in relation to the one below that when all have been placed within the casing, they would appear in the form of spiral steps. The pans are perforated with a plurality of small holes $10^a$ which permit the oil to drain therethrough. Each of these pans has a lug member 11 which fits in a groove in the pan below preventing the vapors from passing between the pans and causing a spiral circulation below the pans and through the dripping oil. To hold the pans in a proper position, vertical spacers 12 are inserted on the tie-rods between the pans as they are put into the casing. The boss members 13 of the pans hold the spacers and support the weight of the pans.

At the top of the casing is supplied a raw oil inlet pipe 14 and at the bottom a draw-off 15 through which the raw oil together with the condensate is drawn from the dephlegmator.

The vapors, on entering the inlet pipes 2 are directed by arrangement of the pans through the circuitous spiral course under the bottoms of the pans thru the dripping oil to the top of the dephlegmator where it is directed by baffle plates to the vapor outlet pipes. The raw oil on the other hand is admitted through the top of the casing through the inlet pipe 14, and drips thru the perforations of the pans. Any overflow from the pans will pass to the pan below and thus the raw oil in a finely divided state will pass down through the dephlegmator, collect in its lower portion with the condensate and be carried off as previously explained through the draw-off 15. It can be readily seen that the raw oil as it drips down thru the vertically arranged pans will have ample chance to intermingle with the hot oil vapors travelling in an opposed direction and will have a dephlegmating effect upon the same as would the passing of these same oil vapors through the body of raw oil. Also the raw oil in dephlegmating the vapors will collect the condensate of the same and carry it back to the heating zone to be retreated. It will be noted that this type of dephlegmator does away with the short circuiting of the vapors which is very common in the present type of aerial condenser and dephlegmators. Also the removable feature of the interior dephlegmating members, by merely removing the top plate is of marked advantage.

The pans may be made to comprise as many degrees of a circle as is desired. I have arbitrarily chosen pans of 120° in the accompanying drawing.

I claim as my invention:

1. In a dephlegmator for condensing vapors, the combination with a tubular body having a removable top portion and vapor inlet and outlet port, of a plurality of perforated shallow receptacles having the shape of the sectors of a circle and mounted one above the other to form a continuous spiral course for vapors, a means for causing a cool liquid to flow downward through the perforated receptacles and intermingle with the vapors, and means for drawing off the cooling liquid and condensed vapors.

2. In a dephlegmator, the combination with a body having a vapor inlet and a vapor outlet, of a plurality of superimposed receptacles mounted one above the other and spirally arranged, said receptacles being perforated, means for introducing a liquid to the top of the dephlegmator to pass downwardly therethrough, the liquid discharging through the perforations in the receptacles, said receptacles being positioned to cause gaseous vapors to pass in a circuitous course through the dephlegmator prior to discharge and to come in contact with the descending liquid, and means for maintaining the receptacles in position comprising tying elements passing through certain of said receptacles.

3. A dephlegmator comprising a casing having a vapor inlet and a vapor outlet port, a plurality of receptacles disposed within said casing and positioned so that the successive receptacles are spirally arranged, said receptacles having perforations therein, means for introducing a cool liquid to the dephlegmator to pass through the apertures in said receptacles, means for introducing the vapors to the dephlegmator through the vapor inlet to pass in the circuitous path formed by the spiral arrangement of the receptacles prior to discharge thereof.

4. A dephlegmator comprising a casing having a vapor inlet and a vapor outlet port, a plurality of receptacles having the shape of sectors of a circle disposed within said casing, and positioned so that the successive receptacles are spirally arranged, said receptacles having perforations therein, means for introducing a cool liquid to the dephlegmator to pass through the apertures in said receptacles, means to introduce vapors to the dephlegmator through the vapor inlet to pass in the circuitous path formed by the spiral arrangement of the receptacles and through the apertures in the receptacles, and means for maintaining the receptacles in position comprising vertical tie rods, each adapted to pass through a plurality of superimposed receptacles.

HERBERT S. MABEY.